United States Patent [19]
Forrestal et al.

[11] Patent Number: 5,962,563
[45] Date of Patent: *Oct. 5, 1999

[54] METHOD FOR CONTROLLING SURFACE CONCENTRATION OF A POLYMER ADDITIVE

[75] Inventors: Lloyd Forrestal, Boulder; Marc Voorhees, Arvada, both of Colo.

[73] Assignee: COBE Cardiovascular Operating Co., Inc., Arvada, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/748,163

[22] Filed: Nov. 12, 1996

Related U.S. Application Data

[60] Provisional application No. 60/006,764, Nov. 15, 1995.

[51] Int. Cl.$^6$ .......................................................... C08J 5/54
[52] U.S. Cl. .................. 524/268; 264/331.12; 264/337; 264/338; 524/267; 524/464
[58] Field of Search .................................. 524/267, 268; 525/464; 264/331.12, 337, 338

[56] References Cited

U.S. PATENT DOCUMENTS

| | | |
|---|---|---|
| 3,686,355 | 8/1972 | Gaines, Jr. et al. . |
| 3,691,257 | 9/1972 | Kendrick et al. . |
| 3,961,122 | 6/1976 | Gaines, Jr. et al. . |
| 4,613,640 | 9/1986 | Deisler et al. . |
| 4,636,552 | 1/1987 | Gay et al. . |
| 4,663,413 | 5/1987 | Ward et al. . |
| 4,675,361 | 6/1987 | Ward . |
| 4,872,867 | 10/1989 | John . |
| 4,929,510 | 5/1990 | Buckenstein et al. . |
| 4,963,595 | 10/1990 | Ward et al. . |

FOREIGN PATENT DOCUMENTS

| | | |
|---|---|---|
| 0 571 787 A1 | 5/1993 | European Pat. Off. . |
| 0571787 | 5/1993 | European Pat. Off. . |
| 59-207922 | 11/1984 | Japan . |

OTHER PUBLICATIONS

Legrand, D.G. & Gaines, G.L. (1970) Am. Chem. Soc., Div. Polymer Chem. Preprints 11:442–446 isman, W.A. (1964) Adv. Chem. Ser. 43.

*Primary Examiner*—Robert Dawson
*Assistant Examiner*—D. Aylward
*Attorney, Agent, or Firm*—Popovich & Wiles, P.A.

[57] ABSTRACT

The surface free energy of a polymer blend where a base polymer contains an additive having a different surface free energy than that of the base polymer can be controlled over a wide range of additive surface concentrations by appropriate choice of the mold surface free energy during fabrication. A high surface concentration of additive relative to a low bulk concentration can be achieved, leading to improved biocompatibility without loss of optical clarity.

8 Claims, 4 Drawing Sheets

METHOD FOR CONTROLLING SURFACE CONCENTRATION OF A POLYMER ADDITIVE

RELATED APPLICATIONS

This application claims the benefit of U.S. Provisional Application No. 60/006,764, filed Nov. 15, 1995.

FIELD OF THE INVENTION

The invention relates to polymeric materials and methods for improving their biocompatibility. More generally, the invention relates to controlling surface concentration of an additive within a polymeric matrix.

BACKGROUND OF THE INVENTION

A basic problem in the construction of medical devices having components that must contact blood and other physiological fluids is that materials with good mechanical and structural properties have rather poor biocompatibility, while highly biocompatible materials have poor structural properties. Biocompatibility is itself a multi-faceted problem which has different aspects depending on the type of device, what tissues or fluids it contacts, and the length of contact time. In devices designed for hemodialysis or blood oxygenation, the materials are in contact with blood flowing through tubing, into containers, and over membranes. The blood returns to the patient's body. The primary elements of biocompatibility are therefore to prevent initiating processes which can subsequently injure the patient, such as activation of clotting mechanisms, activation of the complement system, and initiation of inflammatory reactions. Materials must not be soluble in blood or other body fluids to avoid being carried permanently into the patient's body.

Although certain types of polymers, such as silicones and siloxanes, are known to possess many attributes of biocompatibility, there are no reliable physical correlates which enable one to predict biocompatibility with any degree of certainty. Generally, hydrophobic surfaces are more biocompatible than hydrophilic surfaces. Zisman's critical surface tension [Zisman, W. A. (1964) Adv. Chem. Ser. 43] has been used as a parameter to help assess potential biocompatibility. Materials with an optimum critical surface tension are frequently biocompatible, yet there are notable exceptions. For example, polyethylene and polypropylene have critical surface tensions well within the optimum range, but they are not biocompatible. Other factors are also important. Without a clear understanding of the nature of these factors, biocompatibility remains unpredictable.

Because of the attractive structural properties of polyolefins and polyurethanes, various blending and co-polymerization techniques have been developed to impart greater biocompatibility. U.S. Pat. No. 4,872,867 discloses modifying a polyurethane with a water soluble polymer and crosslinking them in situ with a silane type coupling agent to form a cross-linked and intertwined polysiloxane network. U.S. Pat. No. 4,636,552 discloses a polydimethyl siloxane with polylactone side chains which are said to be useful for imparting biocompatibility when combined with a base polymer, or used to replace plasticizer. U.S. Pat. No. 4,929,510 discloses a diblock copolymer having a more hydrophobic block and a less hydrophobic block. A solution of the diblock copolymer in a solvent which swells the matrix polymer is used to introduce the diblock into an article of matrix polymer. Thereafter, the article is transferred to water, to force orientation of the incorporated diblock copolymer such that the more hydrophobic block is embedded in the matrix and the less hydrophobic block is exposed on the surface of the article. Examples of diblock copolymers included poly (ethyleneoxide-propylene oxide), N-vinyl-pyrrolidone-vinyl acetate and N-vinyl-pyrrolidone-styrene. U.S. Pat. Nos. 4,663,413 and 4,675,361 disclose segmented block copolymers, in particular polysiloxane-polycaprolactone linear block copolymers. The latter were incorporated into base polymer materials to modify the surface properties thereof. Although initially blended in bulk into the base polymer, the copolymer migrates to the surface to form an exceptionally thin, possibly a monolayer film which imparts the desired surface characteristic, specifically, biocompatibility.

U.S. Pat. No. 4,963,595 discloses block copolymers having polycaprolactone blocks and polysiloxane blocks useful as additives to modify a base polymer, such as nylon, and to modify the surface properties thereof. Triblock copolymers having a polysiloxane block flanked by polycaprolactone blocks are commercially available, for example from Thoratec Laboratories, Berkeley, Calif. The abbreviation LSL is used herein to designate triblock copolymers of polylactone-polydimethylsiloxane-polylactone type, generally, and the abbreviation PDMS is used to designate the polydimethylsiloxane block, generally. Thoratec Laboratories provides a series of such polymers designated "SMA" in which the siloxane is dimethyl siloxane and the lactone is caprolactone. The nominal molecular weights (number average) of the polysiloxane blocks suitable for use herein range from about 1000 to about 5000, while the nominal molecular weights of the caprolactone blocks range from about 1000 to about 10,000. A LSL triblock copolymer having polycaprolactone blocks of 1000 and polysiloxane blocks of 1000 (SMA-411) has been shown to be usable, as has a copolymer having polycaprolactone blocks of 10,000 and polysiloxane blocks of 5000 (SMA-4-10-5).

U.S. Pat. No. 3,686,355 disclosed that surface properties of wettability and surface friction could be reduced by addition of block copolymer additives of bisphenol-A and polydimethylsiloxane. It was noted that the effective concentration of the surface-active block copolymer additive at the surface of a shaped polymer composition appeared to depend on the nature of the substrate against which the shaping was carried out, for example by solvent casting or molding. It was believed that a high energy surface substrate material such as glass, mica, metals or metal oxides, adsorbed the copolymer additive from the base polymer surface in contact with it, resulting in loss of copolymer from the polymer surface after separation from the substrate surface. The surface effects of decreased wettability and friction provided by addition of the copolymer additive were therefore maximized by annealing the shaped article or by a solvent application to soften the surface to allow copolymer additive to pass to the surface of the article.

LeGrand et al, (1970) Am. Chem. Soc., Div. Polymer Chem. Preprints 11:442–446, reported studies using bisphenol-A polycarbonate base polymer mixed with an added alternating block copolymer of bisphenol-A carbonate and polydimethylsiloxane (PDMS), measuring ethylene glycol contact angles and static friction coefficients to assess surface hydrophobicity presumably related to surface concentration of the additive. Contact angle on a sample having 1% additive was greater on sample molded between teflon-coated foils than on sample molded between mica sheets.

Polycarbonate is a very useful base polymer for medical devices intended for blood contact, for example blood oxygenators, heat exchangers and dialyzers used in heart surgery, transplant surgery, kidney dialysis and the like. Polycarbonate is advantageous for such applications for a variety of reasons, notably for purposes of the invention herein, because it can be fabricated by molding to achieve complex shapes, and because the devices made of polycarbonate are essentially transparent. The latter is an important consideration for medical personnel using the devices, permitting them to see at a glance whether blood is flowing properly. LSL triblock copolymers are attractive candidates for bulk additives to improve the biocompatibility of polycarbonate surfaces. A problem is encountered when a polycarbonate base polymer is molded with an LSL copolymer. At concentrations greater than about 0.2% of LSL copolymer by weight, optical clarity of the blended material is degraded or lost, the blend becoming cloudy or opaque, possibly due to phase separation of the LSL copolymer. In consequence, the benefits of improved biocompatibility by the addition of an LSL copolymer are compromised by the loss of transparency when sufficient LSL is incorporated to provide adequate biocompatibility.

BACKGROUND OF THE INVENTION

The invention provides methods and operating principles for controlling the concentration of LSL within a 10 Å layer at the surface of the base polymer. Using the method, the concentration of LSL, measured as concentration of the polysiloxane block in the first 10 Å of polymer surface can be varied from about 5% by weight to about 60% where bulk composition is only 0.2% LSL. No annealing is required. The surface concentration has been found to be influenced by the interfacial surface free energy of the mold surface in contact with the base polymer-LSL blend during the molding process. At bulk concentrations of LSL up to 0.2%, a polycarbonate base polymer retains its transparency. Adequate biocompatibility is found where surface concentration of PDMS is 20% (w/w) or greater. Therefore the method of the invention makes it possible to achieve a biocompatible surface without sacrificing transparency. In general, where a certain surface free energy is desired for a polymer blend having an additive with a different surface free energy than the base polymer, a wide range of additive surface concentrations can be achieved by appropriate choice of the mold surface free energy during fabrication.

DETAILED DESCRIPTION OF THE INVENTION

Surface concentration of an LSL copolymer additive in a base polymer can be evaluated by measuring the concentration of the polysiloxane block, using X-ray photoelectron spectroscopy using an X-ray beam at a low take-off angle to the tested surface. The method of the invention can be applied with a number of rigid bulk polymers such as Tenite, a cellulose-based polymer, rigid polyvinyl chloride polymers, polyolefins and polycarbonates. Although described herein in the context of a hydrophobic additive used to make the surface of a relatively hydrophilic polymer more hydrophobic, the process can also be used in the situation where a hydrophilic additive is used to render the surface of a hydrophobic base polymer more hydrophilic.

The base polymer and block copolymer additive can be blended or combined by any technique recognized in the art. During the molding process, the base-additive mixture should be melted to a temperature sufficiently high to allow complete mixing and diffusion of mixture components, rather than mere surface fusion of polymer pellets. For polycarbonate mixtures, 400° F.–600° F. is suitable for use in the invention, with temperatures in the upper half of the range preferred. It will be understood that normal precautions should be taken to avoid thermal decomposition, oxidation or other degradative processes.

In order to retain the normal transparency of polycarbonate, the bulk concentration of LSL additive should not exceed about 0.2% of LSL copolymer, by weight. The exact limit can vary slightly, depending on molecular weight and block length of each block. A preferred concentration is about 0.1% (w/w) of LSL copolymer. Suitable additive LSL copolymers include the Thoratec "SMA" polymers having caprolactone blocks ranging from about 1000 to about 10,000 nominal molecular weight, and siloxane blocks ranging from about 1000 to about 5000 nominal molecular weight. Preferred additives have caprolactone blocks of about 2000 nominal M.W. and siloxane blocks of about 3000–5000 nominal M.W., e.g SMA-423 and SMA-425.

Optimal operation of the invention depends upon intimate contact between the surfaces of the mold and of the polymer being molded. Mold surfaces should be made as smooth as practical. Cleanliness is important, to avoid contaminating mold surfaces with materials that could affect the surface free energy of the mold. Injection molding and compression molding are the preferred methods for forming articles made of LSL-blended polymers because pressure tends to maximize the surface area of contact between polymer and mold surfaces.

Figure 1:
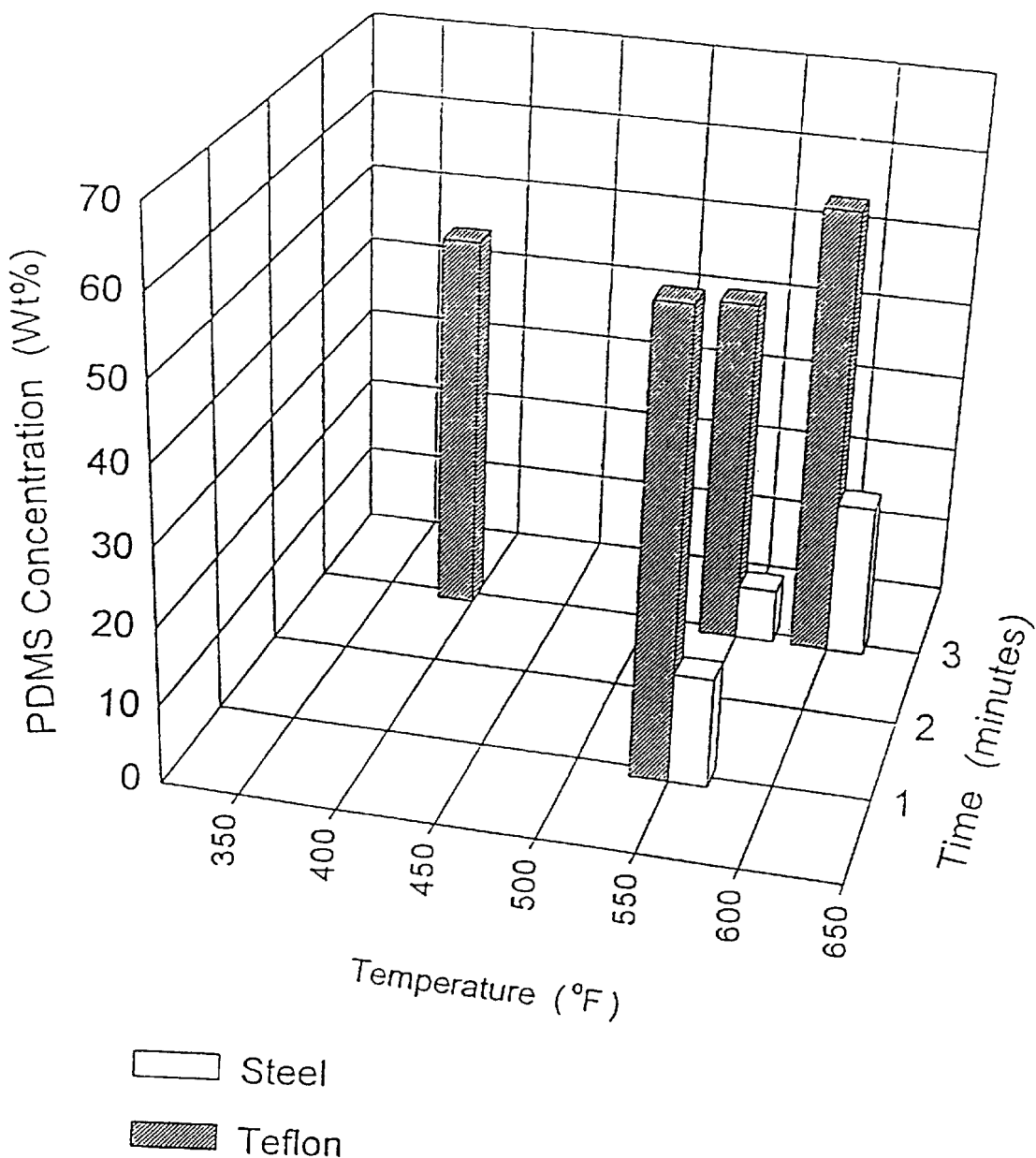
FIG. 1 is a 3-axis graph showing the effect of mold surface free energy on PDMS surface concentration, expressed as weight per cent. Samples were unannealed. Data from Table 1.
Figure 2:
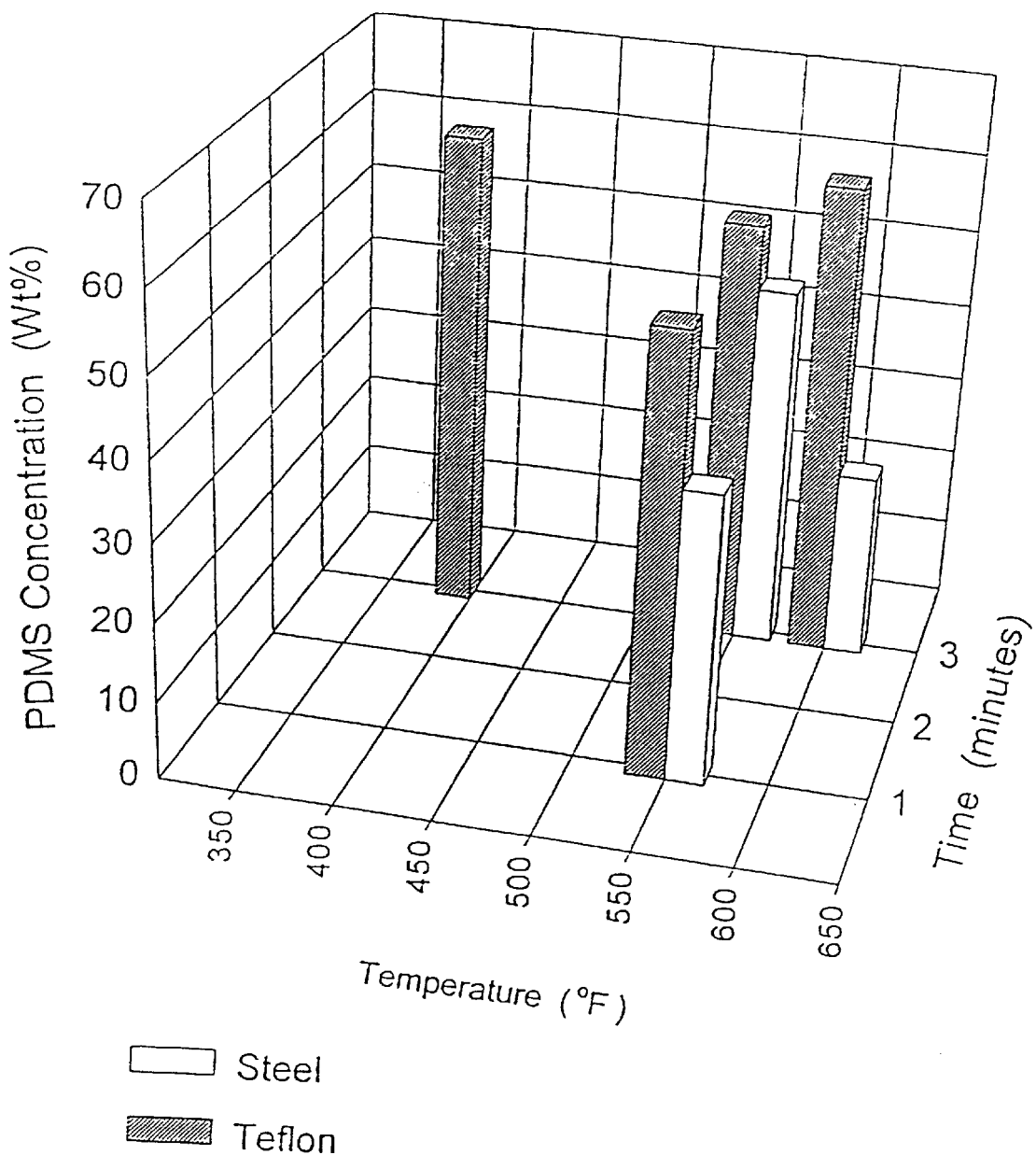
FIG. 2 is a 3-axis bar graph showing the effect of annealing on duplicate samples to those shown in FIG. 1. Data from Table 1.
Figure 3:
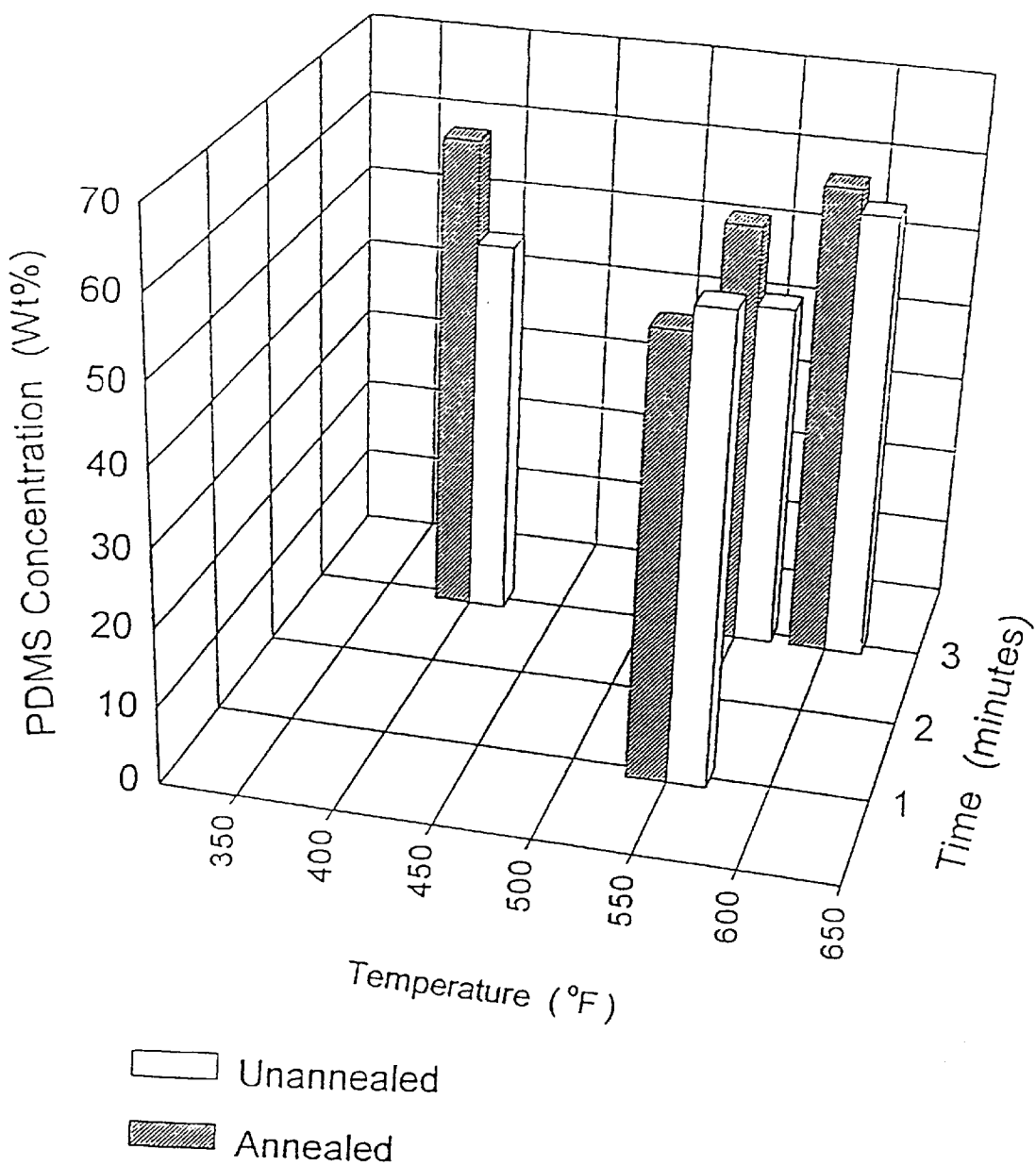
FIG. 3 is a 3-axis bar graph showing a comparison of annealed and unannealed duplicate samples molded against teflon. Data from Table 1.
Figure 4:
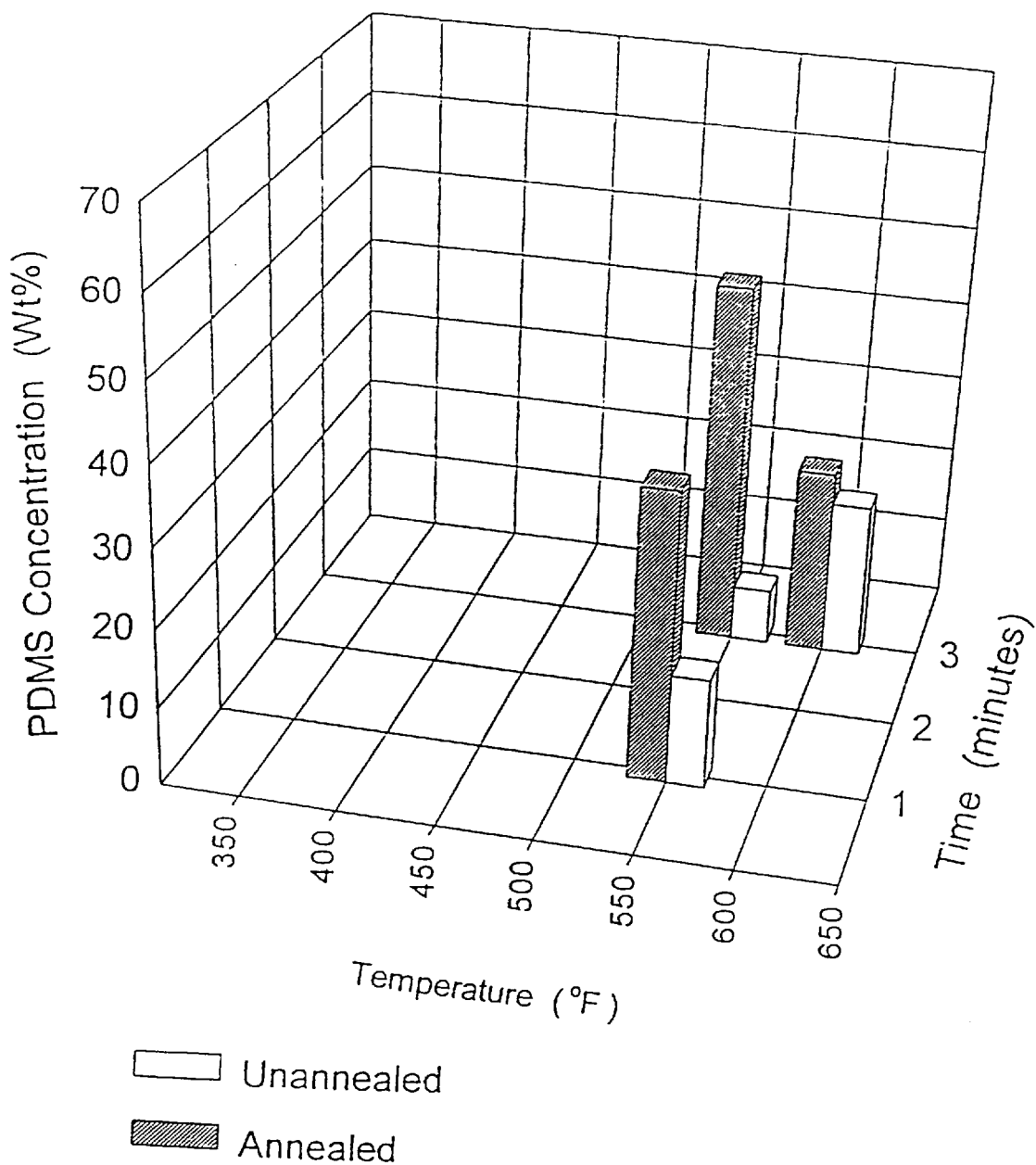
FIG. 4 is a 3-axis bar graph showing a comparison of annealed and unannealed duplicate samples molded against steel. Data from Table 1.

Experiments were conducted using a polycarbonate base polymer mixed with 0.2% (w/w) LSL copolymer (either SMA-425 or SMA-423) compression molded against either teflon (a low surface free energy surface) or against stainless steel (a high surface free energy material. The surface concentration of the LSL additive, expressed as per cent by weight of the polydimethylsiloxane (PDMS) block) in the 10 Å layer at the surface of the molded article was measured by X-ray photoelectron spectroscopy (XPS) (Briggs, D. and Seah, M. P., (1983) *Practical Surface Analysis*, Chapter 4, John Wiley & Sons). The polycaprolactone blocks are considered to be buried in the base polymer to a depth greater than 10 A, so that the surface concentrations determined by XPS reflect the surface concentration of PDMS but not of the entire triblock copolymer. Various melt temperatures were tested. Duplicate samples were annealed subsequently at 135° F. before measuring surface concentration. The results are shown graphically in FIGS. 1–4, which are three-dimensional graphs of the surface concentration of additive copolymer (labeled as polydimethylsiloxane (PDMS) concentration, weight percent) as a function of melt temperature and time (mold surface contact time at the stated temperature). In order to compare PDMS concentrations obtained by XPS analysis and bulk concentrations of SMA-423 or SMA-425, the following relationship was employed. For SMA 423, the weight percent of the PDMS block is 41.23%; for SMA 425, the weight percent of the PDMS block if 51.80%. Therefore a bulk concentration of 0.2% SMA 423 is equivalent to 0.082% PDMS and 0.2% SMA 425 is equivalent to 0.10% PDMS. Unannealed samples molded against steel displayed low surface concentrations of additive, ranging from 7%–20% (w/w) of PDMS. Unannealed samples molded against teflon displayed strikingly higher surface concentrations of additive ranging from 45%–59% w/w) of PDMS. Annealed samples molded against steel displayed significantly increased surface concentrations of additive, 24%–47% (w/w) of PDMS compared to unannealed steel-molded samples. In contrast, annealed samples molded against teflon displayed little, if any, change compared to unannealed, teflon-molded samples, 56%–62% (w/w) of PDMS. A massive increase in additive concentration, as measured by an approximately 600-fold increase in PDMS concentration at the polymer surface over bulk concentration was achieved by molding against teflon, without resort to annealing. By proper selection of the mold material, surface concentration was controlled over a 3–4 fold range, again without resort to annealing. Even higher surface concentrations and concentration ranges can be achieved by optimization of molding conditions, including time, temperature, mold surface treatment, contact-enhancing additives, micro-enlargement of contact surface area and the like.

In general, surface concentration of a low surface free energy additive blended into a higher surface free energy base polymer can be increased by molding the blend against a surface having low surface free energy, and decreased by molding against a surface having high surface free energy. Application of the foregoing principle of the invention has the potential for achieving subtle variations of surface properties of a polymer blend. Such variations can be effected within area domains on the same surface. Since annealing is unnecessary, fine structural features can be incorporated on the polymer surface without being degraded by subsequent annealing. It is also evident to those skilled in the art that the principles of the invention apply in reverse. For example a low surface free energy base polymer can be surface-modiffied by blending a higher surface free energy additive therewith and molding the blend in contact with a high surface free energy mold to maximize surface concentration of the additive and increase the surface free energy of the blend.

EXAMPLE 1

Samples of polycarbonate 2508 [Bayer] were blended with SMA-423 (samples 1–8) or SMA-425 (samples 9–16) to a bulk concentration of 0.2% (w/w) by using a compounding extruder. Samples were heated to the indicated temperature, then pressed between sheets of the indicated material for the indicated time to form small tiles of molded polymer. Surface concentration of additive was measured by low angle (10°) X-ray photoelectron spectroscopy. The analytical results were expressed as weight percent PDMS, as described, supra. The results are tabulated below and represented graphically in FIGS. 1–4.

EXAMPLE 2

To test the hypothesis advanced by LeGrand et al., supra, and in U.S. Pat. No. 3,686,355 that high energy surfaces such as glass or mica would effectively strip off a surface layer of block copolymer from the base polymer, the following experiment was conducted.

Two films each of unmodified 2508 polycarbonate (control samples) and the same resin modified by blending 0.2% SMA 423 (test samples) were cast on microscope slides from methylene chloride solutions. The contact angles (CAs) of the air side, the glass side and the glass surface after stripping were then measured. The CA of clean glass slides was also measured. The results are summarized in the following table.

| CONTACT ANGLES OF CAST FILMS | | | |
|---|---|---|---|
| 2508 Control 1 | 2508 Control 2 | 2508 + 0.2% SMA 423-1 | 2508 + 0.2% SMA 423-2 |
| Air side 81.3° ± 0.8 | 83.6° ± 1.5 | 96.4° ± 0.9 | 95.1° ± 1.5 |
| Glass Side 74.1° ± 1.4 | 76.3° ± 1.3 | 77.1° ± 2.4 | 81.5° ± 1.3 |
| Stripped Glass 14.8° ± 1.7 | 16.5° ± 1.9 | 29.1° ± 1.8 | 36.0° ± 1.1 |

Bare Glass - before coating 13.0° ± 1.2

Observations:
1. Comparing air side control and test samples it was seen that test samples had a much higher contact angle (82° vs. 96°) indicating a high surface concentration of PDMS.
2. A similar difference was not seen between glass side control and test samples (75° vs. 79°) indicating that there was not a high concentration of PDMS on the glass side of the test samples.
3. There was little or no difference in the contact angles of bare uncoated glass and the stripped glass surfaces of the control samples (13° vs. 16°). There was a small but significant difference between bare uncoated glass and the stripped glass surfaces of test samples (13° vs. 33°). If the contact angle of the glass side of the test samples (79°) were the result of a low energy (high contact angle) surface being transferred to the glass, one would expect intuitively that the stripped glass surface would show a contact angle closer to that of the air surface test samples. In fact, whatever the nature of the contaminant on the stripped glass surface, it appeared to be only partially covering the surface. Assuming that the high contact angle component of the SMA had been partially transferred to the test sample glass surface, it is then possible to estimate the surface fraction so covered by employing the so-called "cosine model" (see A. W. Adamson, Physical Chemistry of Surfaces, 3rd Edition: John Wiley; page 346).

$$\cos \theta_c = f_1 \cos \theta_1 + f_2 \cos \theta_2$$

where $\theta_c$=CA of the composite surface $\theta_1$=CA component 1

$\theta_2$=CA component 2

$f_1$=Surface fraction of component 1

$f_2$=Surface fraction of component 2

In the present example $\theta_c$=CA stripped glass=32.6°

$\theta_1$=CA SMA surface=95.8°

$\theta_2$=CA of bare glass=13.0

$f_1$=Surface fraction of SMA $f_2$=Surface fraction of glass

Making appropriate substitutions $$0.8425 = (1-f_2)(-0.1011) + f_2 0.9744$$

$f_2 = 0.8774$

Thus, the stripped glass surface of the test sample is 88% glass and only 12% polymer.

The analysis can be taken one step further. Assuming that the glass side surface is initially (when cast) as PDMS enriched as the air side and that the lower CA measured on the glass side of the test sample is the result of some of the enriched SMA being transferred from the surface during demolding, then, knowing the surface fraction of the material transferred from the glass side it is possible to estimate the expected CA of the glass side surface of the test sample.

In this case $\theta_c$ = Expected CA of the glass side surface $\theta_1$ = CA of unenriched glass side sample, i.e., glass side CA of control, 75.0°

$\theta_2$ = CA of SMA enriched surface, i.e., air side CA of test sample 95.8°

$f_1$ = surface fraction transferred material, 0.12

$f_2$ = surface fraction of material not transferred, 0.88

$$\text{Cos } \theta_c = 0.12 \text{ Cos } 75.0° + 0.88 \text{ Cos } 95.8°$$

$\theta_c = 93.5°$

This is the expected CA of the glass side test sample if the stripping mechanism were correct.

Since the measured glass side surface CA was significantly less (79°), it is unlikely that the difference in CAs between the air side and the glass side of the film resulted from a mechanism of stripping material from the glass side surface as suggested by LeGrand and Gaines. To the contrary, the evidence supports the conclusion that the observed differences result from differences in the free energy of the surfaces against which each side of the film is molded. This result is surprising because it suggests that surface concentration of the additive may be controlled, whereas prior art suggests that the additive is either present on the surface or removed. The present invention allows the bulk concentration of the additive to be predetermined, as well as its surface concentration, by preselecting the surface against which the polymer and additive are molded.

TABLE 1

Surface Concentration of PDMS Percent by Weight

| Melt Temperature Mold Time | 600° F. 3 min | 550° F. 3 min | 550° F. 1 min | 400° F. 3 min |
|---|---|---|---|---|
| Teflon - not annealed | 58 | 45 | 59 | 49 |
| Teflon - annealed | 61 | 55 | 56 | 62 |
| Steel - not annealed | 20 | 7 | 14 | — |
| Steel - annealed | 24 | 47 | 37 | — |

We claim:

1. Method of controlling surface concentration of an LSL copolymer additive in a base polymer article comprising molding the article in a mold composed of a material having a given surface free energy whereby the lower the surface free energy of the mold material, the greater the surface concentration of polylactone-polydimethylsiloxane-polylactone in the resulting molded article.

2. Method of claim 1 wherein the base polymer is polycarbonate and the bulk concentration of polylactone-polydimethylsiloxane-polylactone copolymer additive is less than 0.2 percent by weight.

3. Method of making a polymeric article, said article being composed of a polymer mix including a polycarbonate base polymer containing a polylacton-polydimethylsiloxane polylactone copolymer additive in an amount sufficient to retain normal transparency of polycarbonate, said amount being a maximum of 0.2% by weight bulk concentration of a polylactone-polydimethylsiloxane-polylactone copolymer additive, said bulk concentration corresponding to 0.08% to 0.1% by weight of polydimethylsiloxane in the polylactone-polydimethylsiloxane-polylactone copolymer, and having at least 20% by weight surface concentration of the polydimethylsiloxane component of said additive, comprising the steps of providing a mold having a low surface free energy mold surface;

melt-molding said polymer mix in said mold having said low surface free energy mold surface and selecting said low surface free energy mold surface to provide at least 20% by weight surface concentration of the polydimethylsiloxane component of said additive.

4. Method of claim 3 wherein the mold surface is teflon.

5. A method for controlling surface concentration of a copolymer additive in a base polymer, comprising:

predetermining a surface concentration range of the copolymer additive;

preselecting a mold composed of a material having a predetermined surface free energy such that the lower the material's free energy, the higher the surface concentration of a low surface free energy copolymer and vice-versa; and molding the article in the preselected mold whereby the surface concentration of the copolymer additive is within a predetermined range.

6. The method of claim 5 further comprising predetermining a bulk copolymer additive concentration.

7. The method of claim 5, further comprising reducing the bulk copolymer additive concentration required to achieve the predetermined surface concentration range by preselecting a mold having a low surface free energy.

8. The method of claim 6, further comprising:

selecting a transparent base polymer; and predetermining a bulk concentration of the copolymer additive that retains a normal transparency of the base copolymer.

* * * * *